W. N. McCLELLAN.
CAR DOOR ACTUATING MECHANISM.
APPLICATION FILED MAR. 7, 1921.
Reissued Apr. 18, 1922.
15,338.
4 SHEETS—SHEET 1.
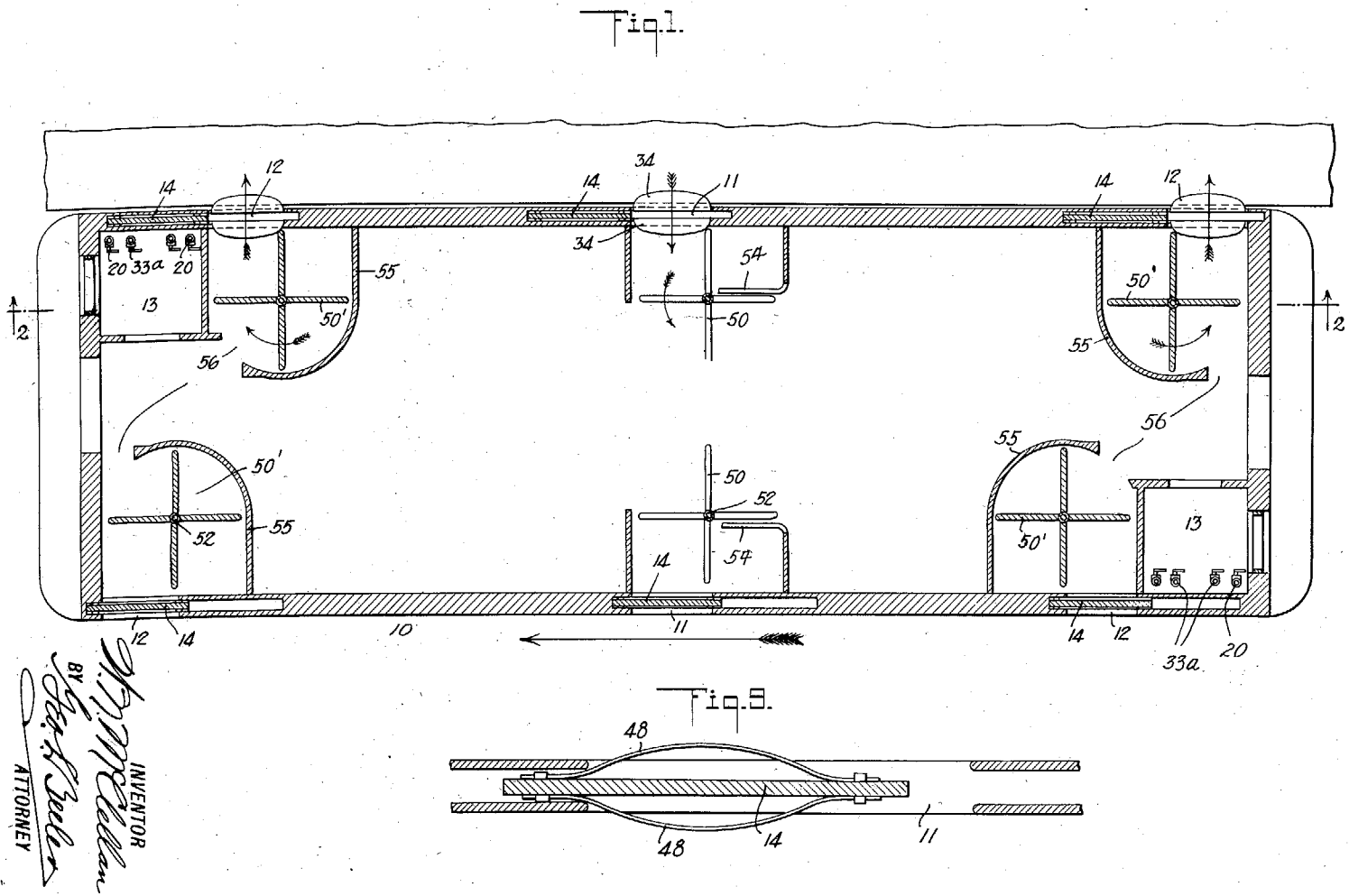

W. N. McCLELLAN.
CAR DOOR ACTUATING MECHANISM.
APPLICATION FILED MAR. 7, 1921.
Reissued Apr. 18, 1922. 15,338.
4 SHEETS—SHEET 2.
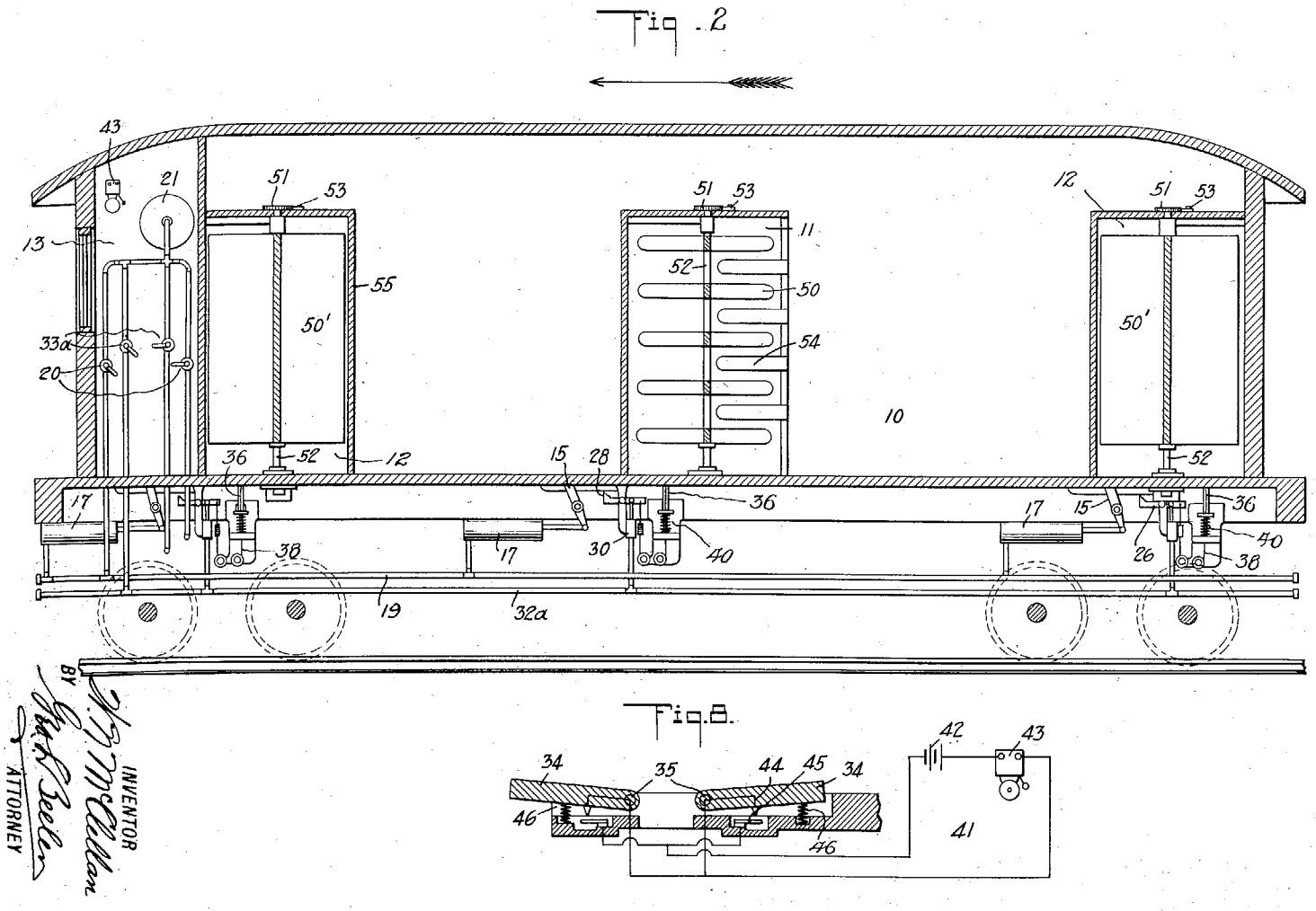
INVENTOR
W. N. McClellan
BY Geo. E. Beeler
ATTORNEY W. N. McCLELLAN.
CAR DOOR ACTUATING MECHANISM.
APPLICATION FILED MAR. 7, 1921.
Reissued Apr. 18, 1922.
15,338.
4 SHEETS—SHEET 3.
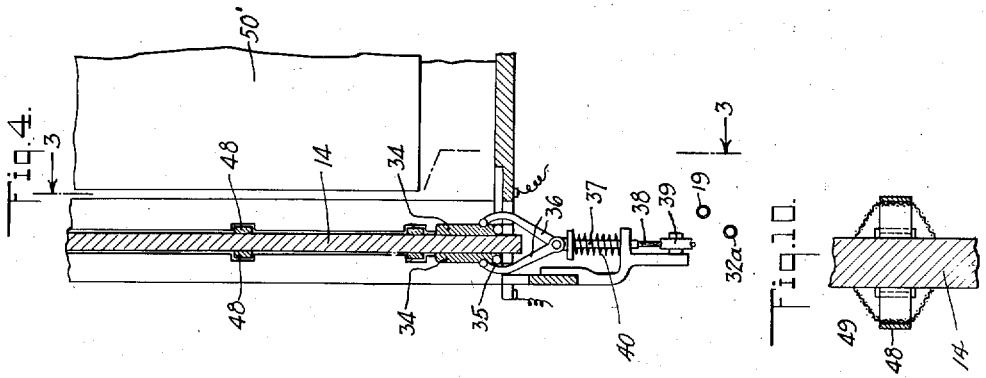
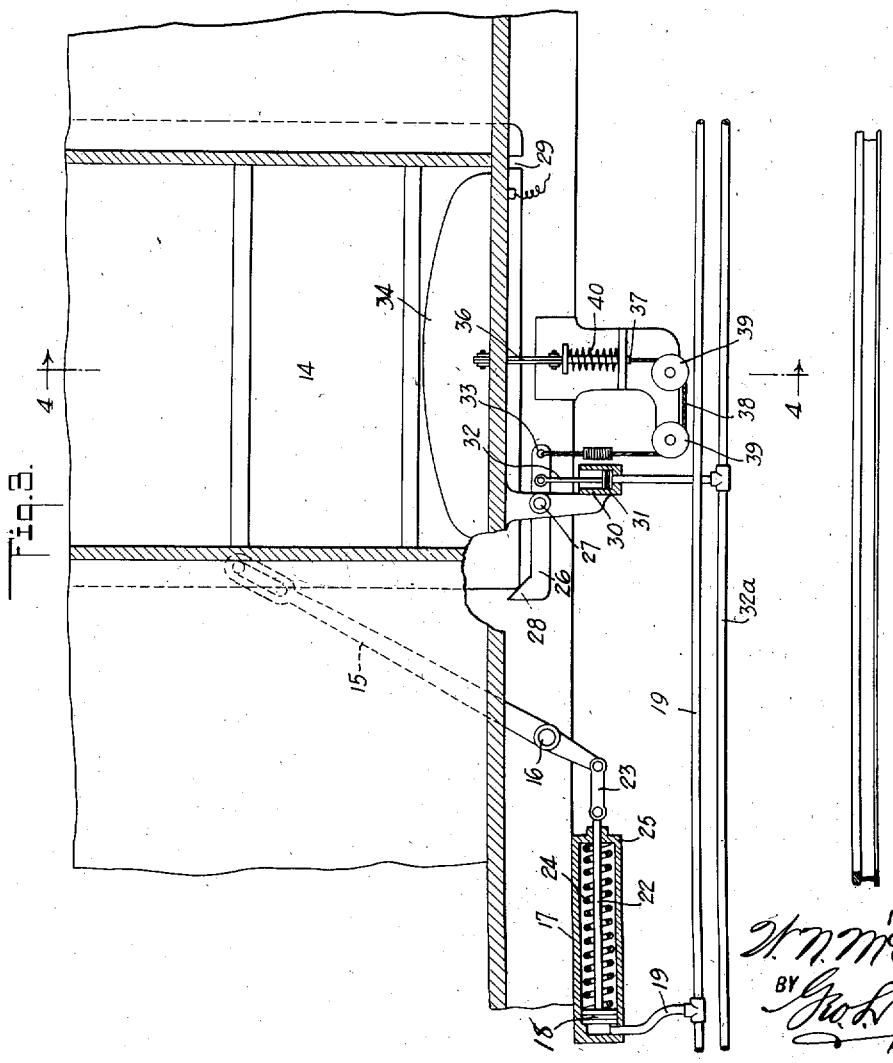
INVENTOR
W. N. McClellan
BY Geo. L. Beeler
ATTORNEY W. N. McCLELLAN.

CAR DOOR ACTUATING MECHANISM.

APPLICATION FILED MAR. 7, 1921.

Reissued Apr. 18, 1922. 15,338.

4 SHEETS—SHEET 4.

INVENTOR

W. N. McClellan

BY Geo. L. Beeler

ATTORNEY

UNITED STATES PATENT OFFICE.

WALTER N. McCLELLAN, OF BROOKLYN, NEW YORK, ASSIGNOR OF FORTY-FIVE PER CENT TO GLADSTONE M. HINKSON, OF BROOKLYN, NEW YORK.

CAR-DOOR-ACTUATING MECHANISM.

15,338. Specification of Reissued Letters Patent. Reissued Apr. 18, 1922.

Original No. 1,369,681, dated February 22, 1921, Serial No. 382,433, filed May 18, 1920. Application for reissue filed March 7, 1921. Serial No. 450,482.

*To all whom it may concern:*

Be it known that I, WALTER N. McCLELLAN, a citizen of the United States, and resident of the city of New York, borough of Brooklyn, in the county of Kings and State of New York, have invented a new and Improved Car-Door-Actuating Mechanism, of which the following is a full, clear, and exact description.

This invention relates to car door operating mechanism and has particular reference to means for controlling the entry and exit of passengers to and from the same, said invention being in the nature of an improvement over the device set forth in Letters Patent of the United States granted to me on the 9th day of March, 1920, No. 1,333,430.

The invention primarily contemplates means for controlling the entry and exit of passengers to and from a car, said means being operable from one control point preferably located within convenient reach of the motorman.

Another object in view is to provide an efficient fare collecting means which controls certain passages of the car.

An important feature of the invention resides in the provision of the safety devices for reducing the possibility of accidents to passengers to a minimum.

A still further object in view resides in the provision of safety doors and means automatically operable thereby for bridging the gap between the station platform and the car.

A further object in view is to provide automatic signaling means which notifies the motorman that the door passages are clear for the closing of the safety doors.

Another feature of the invention is the provision of safety means carried by the door which serves to fend off passengers attempting to board or leave the car while the safety doors are closing.

With the above and other objects in view, some of which will clearly appear hereafter, reference is made to the following description, claims, and accompanying drawings which form a part of this application, and in which,—

Figure 1 is a horizontal sectional view through a railway car constructed in accordance with the invention.

Fig. 2 is a vertical longitudinal sectional view therethrough taken approximately on the line 2—2 of Fig. 1.

Fig. 3 is an enlarged fragmentary vertical longitudinal sectional view taken approximately on the line 3—3 of Fig. 4.

Fig. 4 is a fragmentary vertical transverse sectional view taken on the line 4—4 of Fig. 3.

Fig. 8 is a diagrammatic view of the step controlled signaling means.

Fig. 9 is a horizontal sectional view through one of the doors illustrating the fenders arranged thereon.

Fig. 10 is a detail sectional view of the safety covering which may be used in connection with the fenders.

Figure 5:
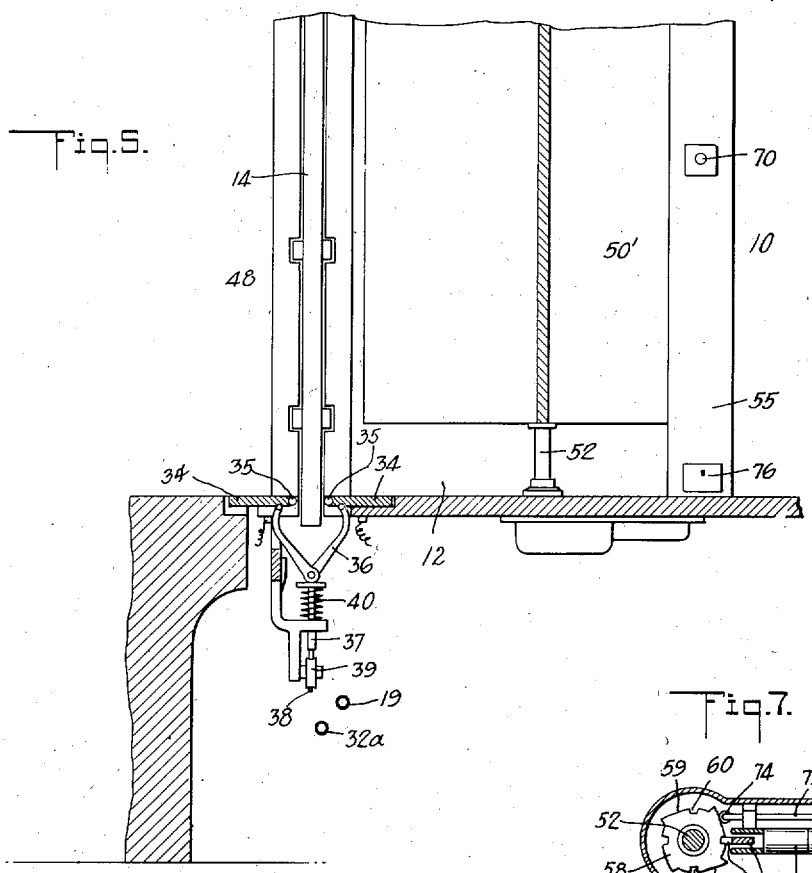
Fig. 5 is a similar view illustrating the open position of the steps for bridging the space between the station platform and the car.
Figure 7:
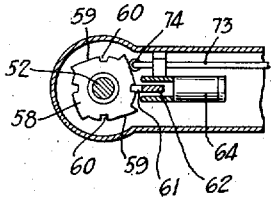
Fig. 7 is a fragmentary horizontal sectional view taken approximately on the line 7—7 of Fig. 6.
Figure 6:
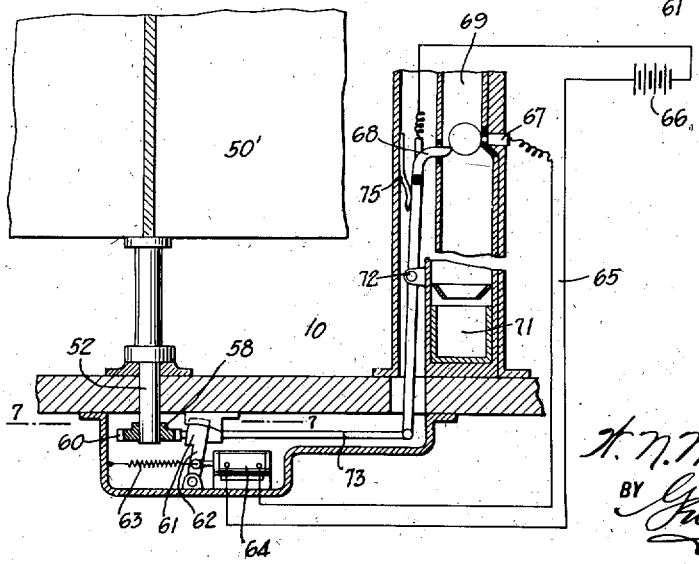
Fig. 6 is an enlarged detail fragmentary sectional and diagrammatic view of the mechanism for controlling the exit from the car.

Referring to the drawings by reference characters 10 designates a car provided on its opposite sides with one or more entrance passages 11 and one or more exit passages 12. The opposite ends of the car are provided with cabs 13 for the operator and in which is arranged the controlling means common to all of the safety doors.

A sliding safety door 14 is arranged adjacent to each entrance and exit passage and each is opened and closed by means of a lever 15 pivoted at 16. Each lever 15 is actuated in one direction by compressed air admitted to the cylinder 17 behind the piston head 18 from a supply pipe 19 when a valve 20 is actuated to admit air to the supply pipe from the reservoir 21 which may be charged in any suitable well known manner. A piston rod 22 is connected by a link 23 to the lever 15 and a coiled compression spring 24 is disposed between the piston head 18 and the cylinder head 25 to normally exert a force for effecting the closing of the door 14. For holding the door closed or open, a latch 26 is pivoted adjacent thereto as at 27, the nose 28 of which is adapted to respectively engage the rear edge of the door or the notch 29 provided in its forward end. The latch is released by compressed air actuated means which includes a cylinder 30 in which is arranged a piston 31 connected by a rod 32 to the latch arm 33, air being admitted to the cylinder by means of an air supply pipe 32[a]. A valve 33[a] located in the cab 13 serves to establish communication between the reservoir 21 and each cylinder 30.

Safety steps 34 are pivoted to the floor of the car at opposite sides of the door 14 as at 35 and are connected by links 36 to a plunger rod 37. A flexible connection in the nature of a cable or chain 38 trained over guide pulleys 39 serves to connect the free end of the rod 37 with the free end of the latch arm 33 whereby the steps 34 will be thrown to bridging position upon releasing movement of the latch. A coiled compression spring 40 serves to normally throw the steps to inoperative position, and said spring at the same time moves the latch 26 to locking position.

To automatically inform the operator when the steps are unoccupied and clear to permit the closing of the safety doors 14, the electric means illustrated in Fig. 8 has been devised. The signaling means comprises a normally open circuit 41 which includes a source of current 42, a signal 43 preferably arranged in the cab 13, and contact members 44 and 45 disposed respectively on each step 34 and on the car floor directly therebeneath. The contact members of the steps are arranged in parallel in the circuit in such a manner that when either step is depressed the signal will be in operation. A short compression spring 46 is disposed between each step and the car floor to normally effect a sufficient elevation of the step to hold the contact members out of engagement. When either of the steps is occupied, the weight of the passenger will serve to depress the same sufficiently to cause the contact members to close the circuit, thereby advising the operator that it is unsafe to close the door. When all of the steps are clear the signal circuit is broken, whereby the operator knows that the doors may be closed with safety.

The safety doors 14 are preferably provided with fenders 48 in the nature of resilient leaf springs normally bowed away from the side faces of the door. The purpose of the fenders is to fend off passengers attempting to enter or leave the passages when the doors are in the act of closing. The fenders are designed to collapse against the side surfaces of the door when the same is retracted within the side of the car for opening its passage. If desired a flexible covering 49 such as canvas or the like may be attached to the fenders 48 to obviate the possibility of the passengers' clothing becoming caught between the fenders and the door.

In addition to the safety doors 14, rotating doors or turnstiles are provided and arranged within the car adjacent to the passages. The turnstiles 50 adjacent to the entrance openings 11 operate to admit of the free entrance of passengers to the car but are provided with means serving to prevent exit therefrom. The said means includes a ratchet wheel 51 mounted on the turnstile shaft 52 and a pawl 53 co-acting with the ratchet to limit rotation of the turnstile in one direction. Obstructing fingers 54 prevent exit of the passengers from the entrance passages 11. Turnstiles 50′ arranged adjacent to the exit passages 12 are preferably housed by vestibule walls 55 each having a door-way 56 communicating therewith. These turnstiles also are limited to rotation in one direction by means of the ratchet wheels 51 and pawls 53 similar to the ones heretofore described. To prevent the exit of passengers through the passages 12 except upon the payment of the required fare, coin controlled locking means is provided which normally prevents rotation of the turnstiles 50′. Said means includes a disc 58 mounted on the lower end of the turnstile shaft 52 and having alternate cam surfaces 59 and notches 60 on the periphery thereof. A detent 61 formed on the end of the pivoted detent arm 62 is normally disposed under the action of a tension spring 63 in one of the notches 60 to prevent rotation of the turnstile. A solenoid 64 is connected with the detent arm 62 and is adapted when energized to release the detent from the notch 60. The solenoid is included in a normally open circuit 65 having a source of energy 66, and spaced contacts 67 and 68 are disposed at opposite sides of a coin chute 69. When the coin is deposited in the opening 70 the same drops into engagement with and bridges the contacts 67 and 68 to close the circuit. The closing of the circuit energizes the solenoid and withdraws the detent from its notch, thereby permitting the turnstile to be rotated. To release the coin to allow the same to drop free of the contact members into the coin box 71, the contact 68 is pivoted at 72, and the lower end thereof is connected to a rod 73, the free end of which is provided with an anti-friction roller 74 arranged in the path of movement of the cams 59 on the disc 58. As the turnstile rotates the cam surfaces 59 co-act in succession with the roller 74 to push the rod 73, which in turn swings the contact 68 to a position to release the coin. A spring 75 serves to return the contact 68 to a position for obstructing the passage of the next coin. A door 76 is provided adjacent to the coin box 71 to permit the removal of the coins therefrom whenever desired.

The safety doors 14 on the opposite sides of the car are respectively controlled independently, but controlling means for all doors on both sides are arranged in each cab 13 to permit the operator to open all of the safety doors on both sides when arriving at a station in which the platforms are disposed at both sides of the car.

While the invention is set forth as a means for controlling or actuating car doors to permit of the entry and exit of passengers to and from the car, the fare system related to said means is also considered a novel and important feature of this invention. By this system the fares are collected and the entrance and exit of passengers to and from the car are efficiently controlled automatically after the operator of the car has opened the safety doors.

I claim:

1. In a car having entrance and exit passages, means permitting of free entry through the entrance passages and preventing exit therefrom, locking means for preventing free exit from the exit passages, coin controlled means for releasing said locking means, outer safety doors for obstructing all the passages and manually controlled means for simultaneously effecting opening or closing of said doors.

2. In a car having entrance and exit passages, means permitting of free entry through the entrance passages and preventing exit therefrom, locking means for preventing free exit from the exit passages, coin controlled means for releasing said locking means, outer safety doors for obstructing all the passages, manually controlled means for simultaneously effecting opening or closing of said doors, means for retaining the safety doors respectively in their closed or opened position, and means for releasing said retaining means.

3. In a car having entrance and exit passages, means permitting of free entry through the entrance passages and preventing exit therefrom, locking means for preventing free exit therefrom, coin controlled means for releasing said locking means, outer safety doors for obstructing all the passages, manually controlled means for simultaneously effecting opening or closing of said doors, retaining means for locking the safety door respectively in their opened position, means for releasing said retaining means, and means operable by said releasing means for bridging the space between the car and an alighting platform.

4. In a car having entrance passages and exit passages, means to prevent exit from the entrance passages and means to limit the exit of passengers from the exit passages comprising rotating doors in the exit passages, means to prevent the rotation of said doors in one direction, means to lock said doors from rotation in the other direction, coin actuated controlling means for releasing said locking means, and safety means cooperating with the rotating doors to reduce to a minimum the possibility of accidents to the passengers.

5. The combination with a railway car having outer sliding doors and inner rotatable entrance and exit doors, of manually controlled means for simultaneously effecting the opening or closing of the sliding doors, means for locking the exit doors against the exit of passengers therefrom, and coin actuated controlling means for releasing said locking means.

6. The combination with a railway car including entrance and exit passages, of outer sliding doors and inner rotating doors for said passages, means for limiting the rotating doors to rotate in one direction, means for preventing exit from the entrance passages, and coin actuated controlling means for the rotating doors of the exit passages.

7. The combination with a railway car having outer sliding doors, and inner rotating entrance and exit doors, of manually controlled means for simultaneously effecting opening or closing of the sliding doors, coin actuated controlling means for releasing the exit doors, means for retaining the sliding doors in open or closed position, means for releasing said retaining means, and means for bridging the space between the car and an alighting platform, said bridging means being operable by said releasing means.

8. A railway car comprising entrance and exit passages, automatic means operated to limit the use of said entrance passage as an entrance, means for locking the exit passage against free exit therefrom, and coin actuated controlling means for releasing said locking means to permit exit from the exit passage, in combination with outer safety doors adapted to close both of the passages.

9. A railway car comprising entrance and exit passages, automatic means operating to limit the use of said entrance passage as an entrance, means for locking the exit passage against exit therefrom, coin actuated controlling means for releasing said locking means to permit exit from the exit passage, in combination with outer safety doors adapted to close both of the passages, and manually controlled means for simultaneously opening or closing said doors.

10. A railway car comprising entrance and exit passages, automatic means functioning to limit the use of said entrance passage as an entrance, means for locking the exit passage against exit therefrom, coin actuated controlling means for releasing said locking means to permit exit from the exit passage, in combination with outer safety doors adapted to close both of the passages, and manually controlled means for simultaneously opening or closing said doors, said controlling means being arranged at a common controlling point in the car.

11. In an inclosure having an entrance passage and an exit passage, means permitting free passage through one of the passages aforesaid in one direction and preventing return passage therethrough, locking means preventing free passage through the other of said passages, coin controlled means for releasing said locking means, safety doors for obstructing the passages aforesaid, and manually controlled means for opening or closing said doors.

12. In a device of the nature set forth having an entrance and an exit passage, means permitting free passage through one of the passages aforesaid in one direction and preventing the return passage therethrough, locking means preventing free passage through the other of said passages, coin controlled means for releasing said locking means, safety appliances for normally obstructing the passages aforesaid, and means manually operated from a distance for controlling said safety appliances.

13. In a car having at least one entrance and one exit passage, means permitting free passage through one of said passages and preventing return passage therefrom, locking means preventing normal free passage through the other of said passages, coin controlled means for releasing said locking means, safety doors for obstructing the passages aforesaid, and manually controlled means for opening or closing said safety doors.

14. In a car having at least one entrance and one exit passage, means permitting free passage in one direction through one of said passages and preventing return passage therethrough, locking means preventing free passage through the other of said passages, coin controlled means for releasing said locking means, safety doors for obstructing both of said passages, means for holding said safety doors in either their closed or open position, and manually controlled means for releasing said holding means.

15. In a car having at least one entrance and one exit passage, means permitting free passage through one of the passages in one direction and preventing return passage therethrough in the other direction, locking means to prevent free passage through the other of said passages, coin controlled means for releasing said locking means, sliding safety doors for obstructing both of said passages, means co-operating with the sliding doors to hold the same in either their closed or open position, means for manually actuating the holding means just mentioned from a distance to simultaneously affect both of the sliding doors, and means operable by the actuation of said manual means for bridging the space between the car and a platform.

16. A vehicle having entrance and exit ways, a barrier at the outer end of said exit-way, means controllable by the operator of the car for moving said barrier, and a second barrier in said exit-way for preventing persons boarding the vehicle through said exit-way operable for opening by passengers going through the exit-way.

17. In a device of the nature set forth having an entrance and an exit passage, means permitting free passage through one of the passages aforesaid in one direction and preventing the return passage therethrough, locking means preventing free passage through the other of said passages, coin controlled means for releasing said locking means, safety appliances for normally obstructing the passages aforesaid, and means for controlling said safety appliances.

WALTER N. McCLELLAN.